US005437585A

United States Patent [19]
Sundseth

[11] Patent Number: 5,437,585
[45] Date of Patent: Aug. 1, 1995

[54] ROLLER DRIVE ASSEMBLY HAVING THE INPUT TO A SUN GEAR PASSING THROUGH A HOLLOW AXLE FORMED BY A CARRIER

[75] Inventor: J. Sundseth, Neuhaus, Germany

[73] Assignee: Electro Pneumatic International GmbH, Hausham, Germany

[21] Appl. No.: 97,964

[22] Filed: Jul. 27, 1993

[30] Foreign Application Priority Data

Jul. 22, 1992 [DE] Germany ............... 42 24 818.3

[51] Int. Cl.$^6$ ............................................. B65G 13/06
[52] U.S. Cl. .................... 475/331; 475/210; 198/782
[58] Field of Search .............. 198/782, 788; 475/210, 475/254, 257, 323, 327, 328, 331

[56] References Cited

U.S. PATENT DOCUMENTS

| | | | |
|---|---|---|---|
| 4,792,037 | 12/1988 | Huber | 198/782 X |
| 5,033,611 | 7/1991 | Huber | 198/782 |
| 5,042,645 | 8/1991 | Pritchard | 198/782 |
| 5,048,672 | 9/1991 | Sundseth | 198/782 |
| 5,215,184 | 6/1993 | Huber | 198/782 |

FOREIGN PATENT DOCUMENTS

| | | | |
|---|---|---|---|
| 391175 | 10/1990 | European Pat. Off. | 198/782 |
| 0440859 | 8/1991 | European Pat. Off. | |
| 0481587 | 4/1992 | European Pat. Off. | |
| 504339 | 7/1930 | Germany | |
| 539805 | 11/1931 | Germany | |
| 1956946 | 12/1972 | Germany | |
| 4033762 | 5/1991 | Germany | |
| 4134534 | 9/1992 | Germany | |

Primary Examiner—Dirk Wright
Assistant Examiner—Kholo Ta
Attorney, Agent, or Firm—Howard & Howard

[57] ABSTRACT

A roller drive assembly comprises a frame on which is mounted a rotatable drive roller which has a rotatable outer shell and which can pivot about an axis eccentric to the axis of rotation of the outer shell between a retracted position and a drive position. A drive motor mounted on the frame outside the drive roller is provided to power the drive roller. Located in the drive roller is a planetary gear system which comprises a sun gear, a ring gear, and a planet carrier bearing planet gears, the ring gear being rotational about the planet carrier and defining at least a part of said outer shell. The planet carrier also defines axle stubs offset from the axis of rotation of the outer shell which are located in bearings mounted in the frame to enable the drive roller to pivot with respect to the frame. A gear train is operationally connected to the drive motor to drive the sun gear and a pinion is located at one end of an output shaft of the gear train. This output shaft passes concentrically through one of the axle stubs of the planet carrier so that the output pinion can drive the sun gear.

16 Claims, 2 Drawing Sheets

ROLLER DRIVE ASSEMBLY HAVING THE INPUT TO A SUN GEAR PASSING THROUGH A HOLLOW AXLE FORMED BY A CARRIER

FIELD OF THE INVENTION

The present invention relates to a roller drive assembly, in particular for use in cargo loading systems for aircraft.

DESCRIPTION OF THE PRIOR ART

Conventionally, roller drive assemblies are used, for example, in the transport of cargo holders on roller conveyors. Such cargo holders may be containers or pallets, and when such containers are to be transported into the loading area of an aircraft for stowage there, the roller drive assembly is installed in the aircraft itself.

When such roller drive assemblies are turned on, the rollers they comprise are swung upwards in such a way as to press against the underside of a cargo container situated above them. Due to this frictional engagement the torque of the drive rollers can be transferred to the floor of the cargo container, so that the drive rollers propel it forward.

A number of problems are encountered in the design of roller drive assemblies for this area of application. For one thing, the force pressing the drive roller against the underside of the container must be as great as possible, but at the same time the pressing force should preferably be tapped off from the torque generated by the motor, so that no special means are required to raise the drive rollers. Moreover, the roller drive assembly must be of small dimensions and low weight. Because a plurality of such assemblies are used simultaneously in a conveyor system, their reliability must be especially high as failure of an assembly can disrupt the loading operation.

A conventional roller drive assembly is described in European Patent Specification EP 0440 859 A1. This known arrangement, however, is complicated structurally and can be equipped with only a relatively small electric motor because the motor is located in the drive roller itself along with all the gear elements, so that with a very large motor the drive roller would become unacceptably large, both in terms of diameter and axial length.

The object of the present invention is to provide a roller drive assembly which has increased reliability and improved traction properties over a conventional assembly without making its construction appreciably more elaborate.

SUMMARY OF THE INVENTION

According to the present invention there is provided a roller drive assembly comprising a frame; a rotatable drive roller which has a rotatable outer shell and which is mounted on the frame so that it can pivot about an axis eccentric to the axis of rotation of the outer shell between a retracted position and a drive position; drive means to power the drive roller mounted on the frame outside the drive roller; a planetary gear system located in the drive roller and comprising a sun gear, a ring gear, and a planet carrier bearing planet gears, the ring gear being rotational about the planet carrier and defining at least a part of said outer shell, and the planet carrier defining axle stubs offset from the axis of rotation of the outer shell; bearings mounted in the frame in which said axle stubs locate to enable said drive roller to pivot with respect to the frame; a gear train operationally connected to the drive means to drive the sun gear; and a pinion located at one end of an output shaft of said gear train, the output shaft passing concentrically through one of said axle stubs of the planet carrier so that the output pinion can drive the sun gear.

Because the drive means, which is usually an electric motor, is positioned not within the drive roller but outside it, in a manner known per se (see German Patent Specification DE 40 33 762 A1), the diameter of the drive roller need not be excessively large. However, because a gear mechanism is provided in the drive roller, the gear train between the motor and the drive roller can be constructed very simply, for example as a toothed belt, so that gear friction losses are slight. Furthermore, because the gear mechanism provided in the drive roller is a planetary mechanism, in which the bearings of the planet carrier are offset from the axis of rotation of the roller shell, extremely high stability is achieved. That is, whereas in conventional roller drive assemblies of this kind both the raising and retraction of the drive roller and its continuous rotation are mediated by the drive shaft so that the drive shaft must be of strong construction, this is no longer the case in the present invention.

Preferably, the sun gear is rigidly connected to a drive ring gear that meshes with the output pinion. As a result, not only is the eccentricity of the arrangement guaranteed, but a first transmission stage with a high transmission ratio is produced.

Preferably also, the gear train comprises a toothed belt. This ensures high efficiency, far exceeding that of conventional assemblies where the drive means are located outside the drive roller.

Preferably also, the planet carrier comprises a substantially hollow body defining a substantially cylindrical outer wall with apertures through which the planet gears protrude beyond the surface of the outer wall. Such an arrangement produces a high stability, even when the thickness of the outer wall is relatively low. In this case, the outer wall is preferably connected to and closed off by discoid end plates from which said axle stubs project outward. This, again, increases the stability of the arrangement and at the same time permits the interior of the drive roller to be simple in structure. This in turn makes the apparatus more stable in operation.

Preferably also, axle stubs are formed integrally with their respective end plates. This simplifies construction and increases stability.

Preferably also, at least one of the end plates is formed integrally with the outer wall. This makes assembly of the arrangement especially simple.

Preferably also, the planet carrier comprises an inner unit which is nonrotatably located in the outer wall and on which the planet gears are mounted. In this way the outer wall of the planet carrier can be relatively simple in structure and manufacture.

Preferably also, an adjustable clutch means is provided operational between the sun gear and the planet carrier in order to raise the drive roller. If in this case the outer wall is simultaneously equipped at its ends with discoid end plates and closed off by the latter, it is advantageous for one of the end plates to be screwed into the outer wall in such a way that the adjustment of the clutch means is dependent on the degree to which the connector has been screwed in. Hence no separate adjustment device is necessary.

Preferably also, the outer shell of the drive roller rotates in a direction opposite to the direction in which the drive roller pivots when moving between its retracted position and its driving position. The result is a clamping effect between the outer shell of the drive roller and the object to be conveyed, so that the tractive force acting on the object simultaneously ensures that the drive roller presses more firmly against the conveyed object. This is known per se and is described in more detail, particularly in European Patent Specification EP 0 391 175 A2. However, it provides another, surprising advantage in relation to the division of the necessary gearing down between a first gear, on the frame, and a second gear in the drive roller. That is, because the torque is transmitted from the gear train on the frame to the drive roller at a relatively high r.p.m., a relatively low torque suffices to raise the drive roller by means of the braking device. If the relative direction of roller rotation were the same as the direction in which the roller is swung up, this small swing torque would not be sufficient to provide a secure engagement between the drive roller and the object to be conveyed. However, with the the specifically chosen direction of rotation, the above-mentioned clamping action occurs, and hence this small swing torque suffices to ensure the first contact between drive roller and object to be conveyed, whereupon the pressing force is guaranteed by the clamping action.

In a preferred embodiment of the invention that utilizes this effect, the outer shell comprises a frictional surface protruding above which is a plurality of resilient frictional elements that are mounted in the frictional surface in such a way that when the drive roller is pivoted from its retracted position into its operating position, an object to be conveyed by the assembly is first contacted by the frictional elements which, as the drive roller moves further into its operating position, are resiliently deformed until they lie flush with said frictional surface which can then make contact with said object to be conveyed. The clamping action is thereby considerably enhanced, so that even very slight swing. torque suffices to achieve a secure engagement between drive roller and object to be conveyed. The smaller-area frictional elements preferably have a higher coefficient of friction than the larger-area frictional surface in order to ensure a secure clamping action even when the forces pressing the roller upward are small. The smaller-area frictional elements can then also be made of a softer material, less resistant to abrasion, because once the clamping action is in operation, that is when the shell of the drive roller is pressed firmly against the underside of the object to be conveyed, the frictional elements are flush with the larger-area frictional surface and no longer bear any great load.

Preferably also, resilient frictional elements are annularly disposed in grooves defined around the circumference of the outer shell.

Preferably also, the frame is constructed as a two-part housing in which said drive means and said gear train are substantially hermetically enclosed. Because of the two-part structure there is a single surface to be sealed, which simplifies the hermetic sealing of the housing.

Preferably also, at least one of said axle stubs is provided with a radially projecting stop which can strike one of two opposing stop faces defined by the frame in order to limit the amplitude of the rotational motion of the drive roller when it pivots from its retracted position into its operating position. This arrangement ensures that even when the objects to be conveyed are light in weight, the drive rollers cannot swing through a complete rotation more than 360° and thereby elevate the conveyed object repeatedly at periodic intervals.

BRIEF DESCRIPTION OF THE DRAWINGS

The present invention will now be described by way of example with reference to the accompanying drawings, in which.

DESCRIPTION OF THE PREFERRED EMBODIMENT

Figures 1, 2:
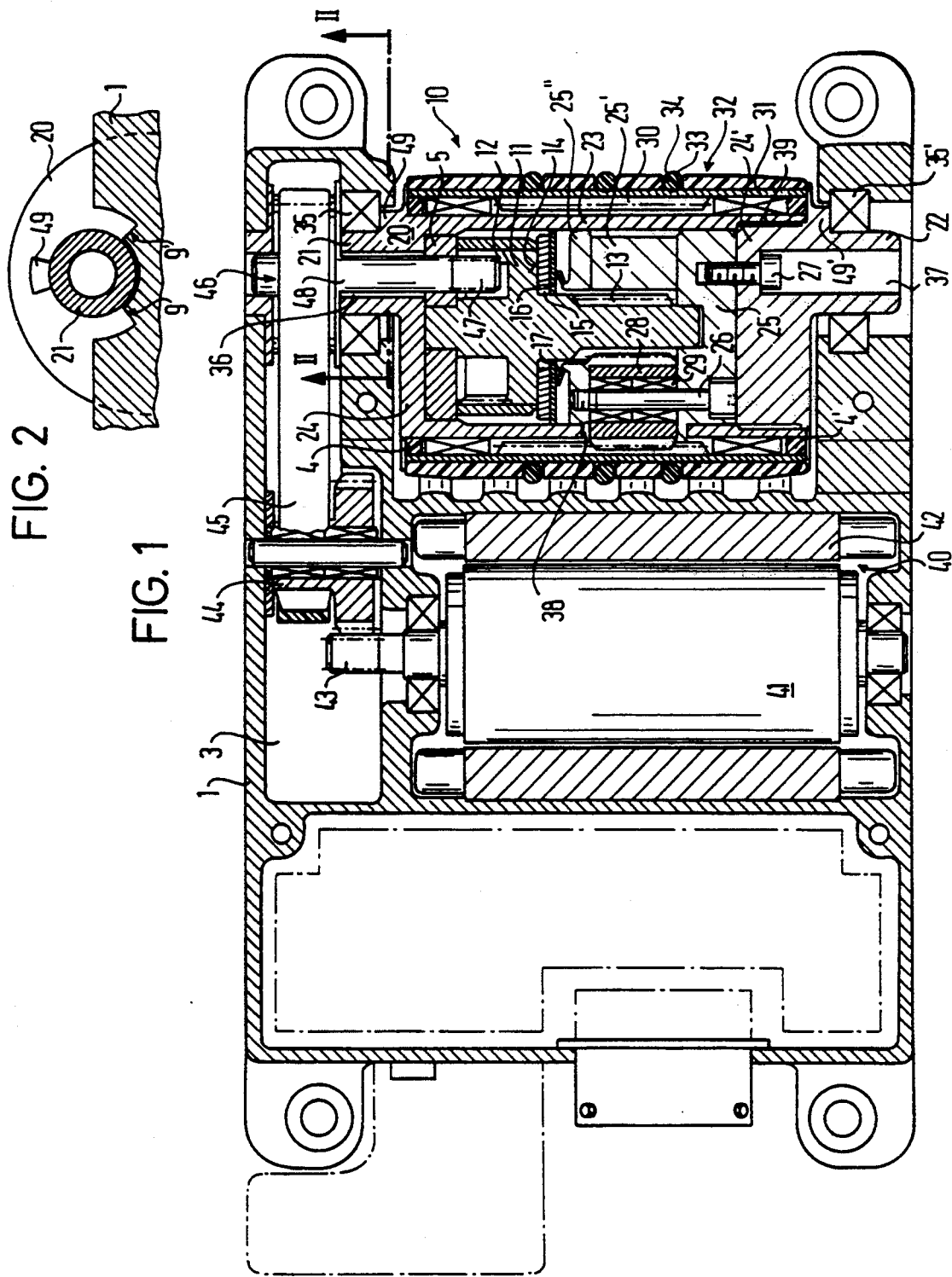
FIG. 1 is a horizontal cross-section through a drive roller assembly according to the invention.
FIG. 2 is a partial sectional view along the line II-II in FIG. 1.
Figure 4:
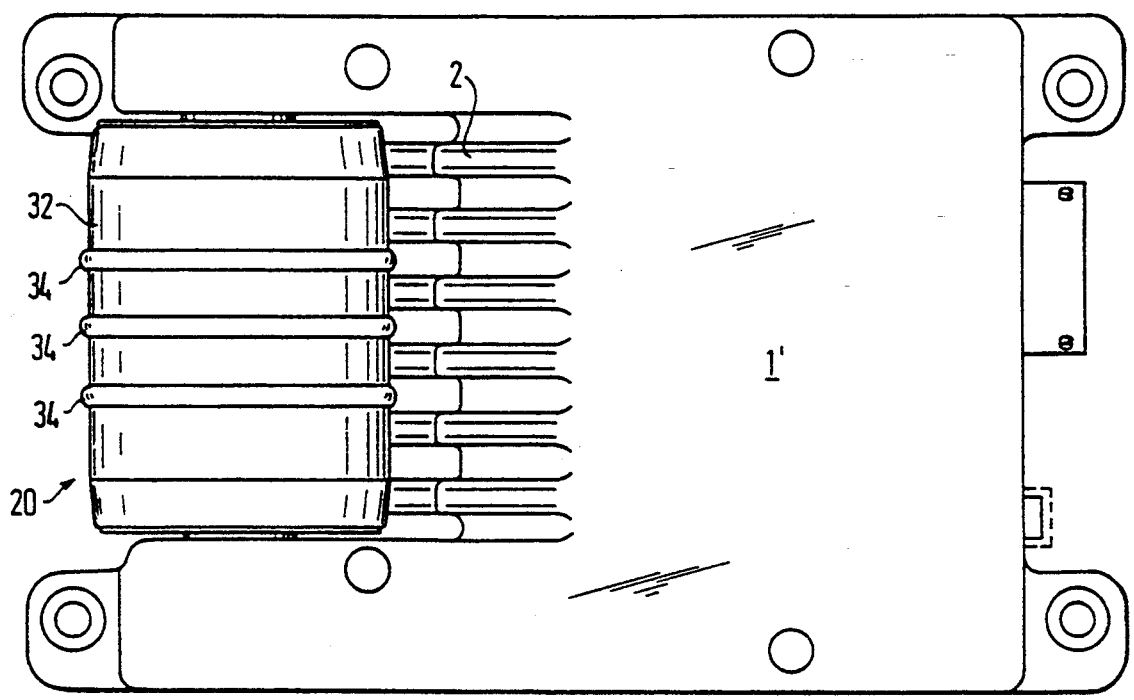
FIG. 4 is a plan view of the assembly.

As shown in the drawings, a preferred embodiment of the invention comprises a lower frame portion 1 and an upper frame portion 1', which are separated from one another by a single continuous sealing face and are held together by screw bolts (not shown).

In the frame 1, 1' is disposed a drive means in the form of an electric motor 40, a stator 42 of the motor 40 being firmly clamped within a correspondingly shaped recess in the frame, where it can be fixed by adhesive if appropriate. The heat generated in the stator 42 is dissipated to the exterior by way of cooling fins 2 of the frame 1, 1'. The cooling fins 2 simultaneously offer protection against objects touching or being caught in the roller (as in the steps of an escalator).

A rotor 41 of the electric motor 40 is mounted in the frame 1, 1' by bearings at its ends. Its drive pinion 43 projects into a gear cavity 3 in the frame 1, 1'.

In the gear cavity 3 is rotatably mounted a transmission gear 44 comprising a toothed wheel and an integral pulley. The toothed wheel meshes with the drive pinion 43, while a toothed belt 45 is seated on the pulley. The toothed belt 45 runs over a drive pulley 46 fixed to an output shaft 48 that is rotatably mounted in the frame 1, 1'.

The output shaft 48 projects out of the cavity 3 and at the end opposite the drive pulley 46 it bears an output pinion 47.

At the end of the frame 1, 1' there is a U-shaped recess within which is seated a drive roller 10.

The drive roller 10 comprises an outer shell 32 with circumferential grooves 33, within which are mounted frictional elements comprising friction rings 34 made of an resilient material with a high coefficient of friction. The outer shell 32 rests on a sleeve 31, the inner surface of which is toothed to form a ring gear 30.

The interior teeth of the ring gear 30 mesh with teeth of planet gears 28, only one of three is shown in the FIG. 1, mounted on bearings 29. The bearings 29 in turn are seated on bearing bolts 26 that join together three sections 25, 25' and 25" of an inner unit. The inner unit 25, 25', 25" is nonrotatably fixed by keying within an outer wall 23. The outer wall 23 includes apertures 38 through which the planet gears 28 project above the outer surface of the outer wall 23.

The sleeve 31 is rotatably mounted on the outer wall 23. The gap between the outer wall 23 and the sleeve 31 is closed off by seals 4, 4'.

At its end toward the output shaft 48, the outer wall 23 is continuous and integral with an end plate 24. Eccentric to the long axis of the sleeve 31, the end plate 4 bears a first axle stub 21 that is seated in the frame 1, 1' by means of a drag bearing 35. In the axle stub 21 there is a concentric bore 36 through which the output shaft 48 extends into the interior of the sleeve 31.

Within the sleeve 31 there is also nonrotatably disposed a bearing plate 5 that includes a bore through which the output shaft 48 passes.

Between the bearing plate 5 and the inner unit 25, 25', 25" is rotatably disposed a sun gear 11 which, on its side toward the output shaft 48, bears a drive ring gear 12 that meshes with the output pinion 47. At its other end the sun gear 11 bears a drive pinion 13 (the actual sun gear), which meshes with the planet gears 28.

On the axial back surface of the drive ring gear 12 is disposed clutch means comprising a frictional surface 14, on which an annular clutch disc 15 is seated. The disc 15 in turn is seated on a pressure disc 16 which is biased toward the surface 14 by a disc spring 17, the disc spring 17 in turn being seated on the section 25" of the inner unit.

Opposite the end plate 24, which is formed integrally with the outer wall 23, an discoid end plate 24' is provided, which is screwed into the outer wall 23 by way of a threaded channel 39. The inner unit 25, 25', 25" is displaced toward the frictional surface 14 by an amount depending on the distance to which the end plate 24' is screwed into the outer wall 23, so that the disc spring 17 is put under compression and the responsiveness of the clutch action between the sun gear 11 and the planet carrier 20 (comprising the parts 23–29) can thereby be adjusted. It is this frictional force that causes the roller to swing upward when the motor is turned on, from a lower retracted position (shown in phantom in FIG. 3) into an upper operating position.

The end plate 24' bears a second axle stub 22 corresponding to the first axle stub 21, likewise with a bore 37. Through this bore 37 a fixation bolt 27 is inserted, which is screwed into section 25 of the inner unit. Because the inner unit 25, 25', 25" can be displaced axially but is nonrotatably seated in the outer wall 23, the fixation bolt ensures that the end plate 24' does not rotate when it has been positioned in the outer wall 23.

The second axle stub 22 is fixed in the frame 1, 1' by means of a second drag bearing 35'.

Figure 3:
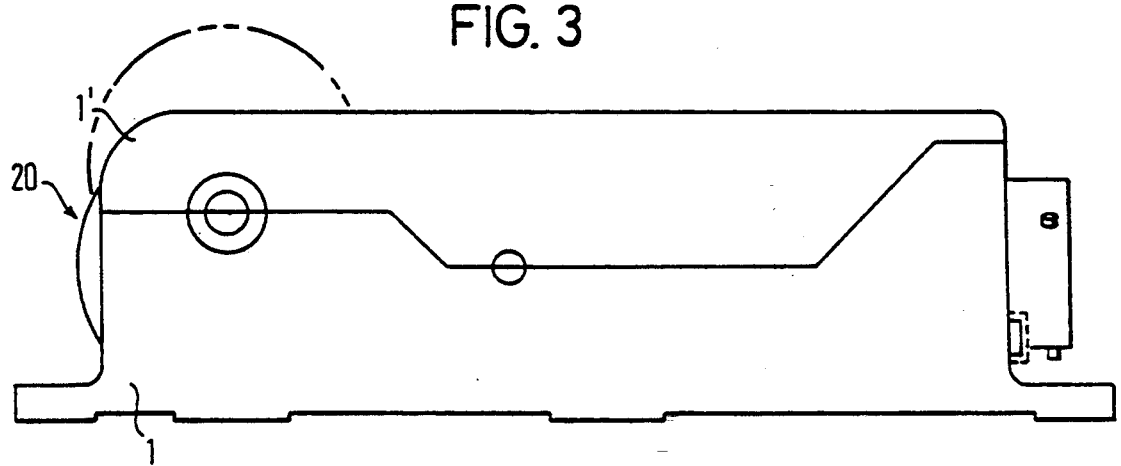
FIG. 3 is an end elevation of the assembly.

Both axle stubs 21, 21' bear stops 49, 49' on their ends next to the end plates 24, 24', as shown in FIG. 2, and the lower half of the frame 1 bears opposing stop faces 9, 9'. When the drive roller 10 is swung upward, the end point of its travel into the operating position, at which point the roller is raised higher than the position shown in FIGS. 2 and 3, is defined by the contact between the stops 49, 49' and the opposing stop faces 9, 9'.

Because in the roller drive assembly the power of the electric motor 40 is transmitted by way of the output shaft 48 at a relatively high rate of rotation but with relatively low torque, the torque acting on the drive roller 10 about the vertical axis is very slight. Furthermore, the output shaft 48 can be of relatively small diameter because, as mentioned above, the transferred torque is low. In contrast, the axle stubs 21, 22 can be very sturdy without adding very much weight, because they are so short.

The sleeve 31 can also be thin-walled without impairing the stability of the arrangement, because the sleeve 31 has a relatively large diameter and hence is extremely rigid in the direction parallel to the axis of the drive roller 10. Finally, all elements of the gear system can be tightly sealed, as is readily discernible in the drawings, with no great effort, because it is necessary merely to provide one pair of seals 4, 4' between surfaces in continuous rotatory motion with respect to one another.

What is claimed is:

1. A roller drive assembly comprising
    a frame;
    a rotatable drive roller which has a rotatable outer shell and which is mounted on the frame so that it can pivot about an axis eccentric to the axis of rotation of the outer shell between a retracted position and a drive position;
    drive means to power the drive roller mounted on the frame outside the drive roller;
    a planetary gear system located in the drive roller and comprising a sun gear, a ring gear, and a planet carrier bearing planet gears, the ring gear being rotational about the planet carrier and defining at least a part of said outer shell, and the planet carrier defining outwardly protecting axle stubs offset from the axis of rotation of the outer shell;
    bearings mounted in the frame in which said axle stubs locate to enable said drive roller to pivot with respect to the frame;
    a gear train operationally connected to the drive means to drive the sun gear; and
    said gear train including an output shaft passing freely rotatably and concentrically through one of said axle stubs of the planet carrier and operatively connected to an internal gear, and a pinion disposed on and extension of the internal gear and operatively connected to the sun gear.

2. An assembly as claimed in claim 1, wherein the sun gear is rigidly connected to a drive ring gear that meshes with the output pinion.

3. An assembly as claimed in claim 1, wherein the gear train comprises a toothed belt.

4. An assembly as claimed in claim 1, wherein the planet carrier comprises a substantially hollow body defining a substantially cylindrical outer wall with apertures through which the planet gears protrude beyond the surface of the outer wall.

5. An assembly as claimed in claim 4, wherein said outer wall is connected to and closed off by discoid end plates from which said axle stubs project outward.

6. An assembly as claimed in claim 5, wherein said axle stubs are formed integrally with their respective end plates.

7. An assembly as claimed in claim 5, wherein at least one of said end plates is formed integrally with said outer wall.

8. An assembly as claimed in claim 4, wherein the planet carrier comprises an inner unit which is nonrotatably located relative to the outer wall and on which the planet gears are mounted.

9. An assembly as claimed in claim 1, wherein an adjustable clutch means is provided operational between the sun gear and the planet carrier.

10. An assembly as claimed in claim 5, wherein an adjustable clutch means is provided operational between the sun gear and the planet carrier, and one of said discoid end plates is threadably received into the outer wall.

11. An assembly as claimed in claim 1, wherein the outer shell of the drive roller rotates in a direction opposite to the direction in which the drive roller pivots when moving between its retracted position and its driving position, the outer shell comprising a frictional surface protruding above which is a plurality of resilient frictional elements.

12. An assembly as claimed in claim 11, wherein said resilient frictional elements have a higher coefficient of friction than said frictional surface.

13. An assembly as claimed in claim 11, wherein said resilient frictional elements are annularly disposed in grooves defined around the circumference of the outer shell.

14. An assembly as claimed in claim 11, wherein said resilient frictional elements are disposed in a middle region of the outer shell with respect to its longitudinal axis.

15. An assembly as claimed in claim 1, wherein the frame is constructed as a two-part housing in which said drive means and said gear train are enclosed.

16. An assembly as claimed in claim 1, wherein at least one of said axle stubs is provided with a radially projecting stop which can strike one of two opposing stop faces defined by the frame in order to limit the amplitude of the rotational motion of the drive roller when it pivots from its retracted position into its operating position.

* * * * *